United States Patent
Lee

(10) Patent No.: US 9,835,517 B2
(45) Date of Patent: Dec. 5, 2017

(54) AIRTIGHT TEST APPARATUS AND AIRTIGHT TEST METHOD USING THE SAME

(71) Applicant: PEGATRON CORPORATION, Taipei (TW)

(72) Inventor: Yen-Pang Lee, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 517 days.

(21) Appl. No.: 14/277,043

(22) Filed: May 13, 2014

(65) Prior Publication Data

US 2014/0360251 A1 Dec. 11, 2014

(30) Foreign Application Priority Data

Jun. 10, 2013 (TW) .............................. 102120549 A

(51) Int. Cl.
*G01M 3/34* (2006.01)
*G01M 3/32* (2006.01)

(52) U.S. Cl.
CPC .......... *G01M 3/329* (2013.01); *G01M 3/3209* (2013.01)

(58) Field of Classification Search
CPC ............................ G01M 3/329; G01M 3/3209
USPC ......................................................... 73/49.3
See application file for complete search history.

(56) References Cited

U.S. PATENT DOCUMENTS

| | | | | |
|---|---|---|---|---|
| 3,998,091 A | * | 12/1976 | Paquette | ................. G01M 3/36 73/49.3 |
| 6,450,012 B1 | * | 9/2002 | Mayer | .................... G01M 3/227 73/40.7 |
| 2005/0248744 A1 | * | 11/2005 | Shibazaki | ........... G03F 7/70716 355/72 |
| 2012/0125085 A1 | | 5/2012 | Wu | |
| 2012/0204516 A1 | * | 8/2012 | Palumbo | ............... B65B 31/028 53/403 |

FOREIGN PATENT DOCUMENTS

| | | |
|---|---|---|
| CN | 202177493 U | 3/2012 |
| CN | 202420793 U | 9/2012 |
| TW | M429866 U1 | 5/2012 |

* cited by examiner

*Primary Examiner* — John Fitzgerald
*Assistant Examiner* — Rodney T Frank
(74) *Attorney, Agent, or Firm* — Winston Hsu

(57) ABSTRACT

The present invention discloses an airtight test apparatus and an airtight test method using the same for testing an airtight property of a case assembled with a plurality of additional members thereon in which the case has through holes corresponding to the additional members. The airtight test apparatus comprises a base, a top plate and a plurality of sealing members selectively and detachably disposed on the top plate. The top plate is capable of moving towards the base to allow the sealing members to correspondingly seal the through holes. During test, the case is placed on the base to form a gas chamber, an air-extracting is performed for the gas chamber and an air pressure is detected. When the detected air pressure is larger than a predetermined value, the sealing members can be selectively utilized to seal the corresponding through holes for determining which through holes have poor airtight property.

14 Claims, 13 Drawing Sheets

AIRTIGHT TEST APPARATUS AND AIRTIGHT TEST METHOD USING THE SAME

CROSS-REFERENCE TO RELATED APPLICATIONS

This application claims the priority benefits of Taiwan Patent Application No. 102120549, filed on Jun. 10, 2013. The entirety of the above-mentioned patent applications are hereby incorporated by references herein and made a part of specification.

BACKGROUND OF THE INVENTION

Field of the Invention

This invention relates to an airtight test apparatus and method and, more particularly, to a test apparatus and method by using an air-extracting method to test an airtight property of a case assembled with additional members.

Description of the Related Art

Electronic devices will have different requirements of protection depended on various environment. For example, water proof, dust proof and so on. Sealing defects of the device are normally occurred on the gage of shell, the additional members on the shell which has a through hole (for example, speaker, microphone and port and so on) and the additional members themselves. Although the airtight property of the additional members is well, the additional members are fixed on the case by a coverlay. If the stickiness of the coverlay is not strong enough, the additional members will be not attached well with the case and fall off or have a gap between to allow the electronic device having a poor airtight property. Furthermore, if the coverlay is not even enough, there is still a gap occurred after attaching the additional members so that the airtight property of the electronic device is also poor. The conventional manufacturing process mainly performs the water proof or duct proof tests after assembling whole model in order to confirm the overall sealing condition. However, the poor airtight property is occurred after the assembly of the whole parts is finished so that it is difficult to rework and the cost is increased. When the sealing defect is too bad to discard, it will cause the unnecessary assembling cost and devices waste. Furthermore, generally speaking, the case of the device will have a plurality of sealing regions, such as speaker, microphone and ports. It is hard to confirm which sealing regions result in the defects. It also increases the difficulties of rework. If it is necessary to check the airtight property of each of the sealing regions, a tape may be used to attach the region needed to be sealed and only one sealing region will be remained for testing. However, repeating the actions of tape attached and removed will be wasted a lot of time and be necessary operated by people, so the testing cost is hard to decrease.

BRIEF SUMMARY OF THE INVENTION

According to the problem in the prior art, an object of the present invention is to provide an airtight test apparatus using a plurality sealing members assemble and disassemble easily so as to perform an airtight test conveniently and efficiently for a plurality of through holes of a case thus to save the cost of the test. And further, a sealing defect can be early detected as it is used in an in-process inspection so that the rework cost will be reduced efficiently.

The airtight test apparatus of the present invention is provided for testing an airtight property of a case assembled with a first additional member and a second additional member thereon. The case can be a part of an electronic device, such as a portion of housing, however, the present invention is not limited thereto. The case has a first through hole connected to the first additional member and a second through hole connected to the second additional member. The airtight test apparatus comprises a base, a top plate, a first sealing member and a second sealing member. The base is provided for carrying the case and has an air-extracting hole. When the case is placed on the base, the case and the base form a gas chamber connected to the air-extracting hole and the gas chamber is capable of exhausting through the air-extracting hole. The top plate is disposed on the base and is capable of moving with respect to the base. The first sealing member and the second sealing member can be selectively and detachably disposed the top plate, respectively. When the case is placed on the base, the top plate is capable of moving towards the base to allow the first sealing member to be against the case for sealing the first through hole and to allow the second sealing member to be against the case for sealing the second through hole. Thus, an operator can easily disassemble the first sealing member and the second sealing member on the top plate and then selectively seals the first through hole or the second through hole to test whether the airtight property of the first through hole and the second through hole and the first additional member and the second additional member is bad or not.

Another object of the present invention is to provide an airtight test method using the airtight test apparatus of the present invention for testing an airtight property of a case. It utilizes a plurality of sealing members assemble and disassemble easily so as to perform an airtight test conveniently and efficiently for a plurality of through holes of a case thus to save the cost of the test. And further, a sealing defect can be early detected as it is used in an in-process inspection so that the rework cost will be reduced efficiently.

The airtight test method of the present invention uses the airtight test apparatus to test the airtight property of the case assembled with a first additional member and a second additional member thereon. The case can be a part of an electronic device, such as a portion of housing, however, the present invention is not limited thereto. The case has a first through hole connected to the first additional member and a second through hole connected to the second additional member. The base has an air-extracting hole. The top plate is disposed on the base and is capable of moving with respect to the base. The first sealing member and the second sealing member are selectively and detachably disposed on the top plate both. The airtight test method comprises steps of: placing the case on the base to allow the case and the base to form a gas chamber connected to the air-extracting hole; selectively and detachably disposing he first sealing member or the second sealing member on the top plate; allowing the top plate to move towards the base until the first sealing member or the second sealing member already disposed on the top plate is against the case onto the base for sealing the first through hole or the second through hole; extracting air from the gas chamber through the air-extracting hole; and detecting an air pressure of the gas chamber for determining the airtight property of the case. Thus, the operator can easily disassemble the first sealing member and the second sealing member on the top plate and then selectively seals the first through hole or the second through hole to test whether the airtight property of the first through hole and the second through hole and the first additional member and the second additional member is bad or not.

Comparing to the prior art, the airtight test apparatus and the airtight test method of the present invention use a plurality of sealing members assemble and disassemble easily so as to perform an airtight test conveniently and efficiently for a plurality of through holes of a case thus to save the cost of the test. And further, sealing defects of semifinished products between the case and the additional members can be early detected as the airtight test apparatus and the airtight test method of the present invention are used in an in-process inspection so that the rework can be further performed or it avoids the defective products entering next process for reducing the rework cost efficiently. The increment of the rework difficulty resulting from insufficient airtight property detected after finishing the products, useless assembling cost and unnecessary parts also can be avoided.

The advantages and features of the present invention can be further understood by the following descriptions and attached drawings.

DETAILED DESCRIPTION OF THE INVENTION

Figure 1:
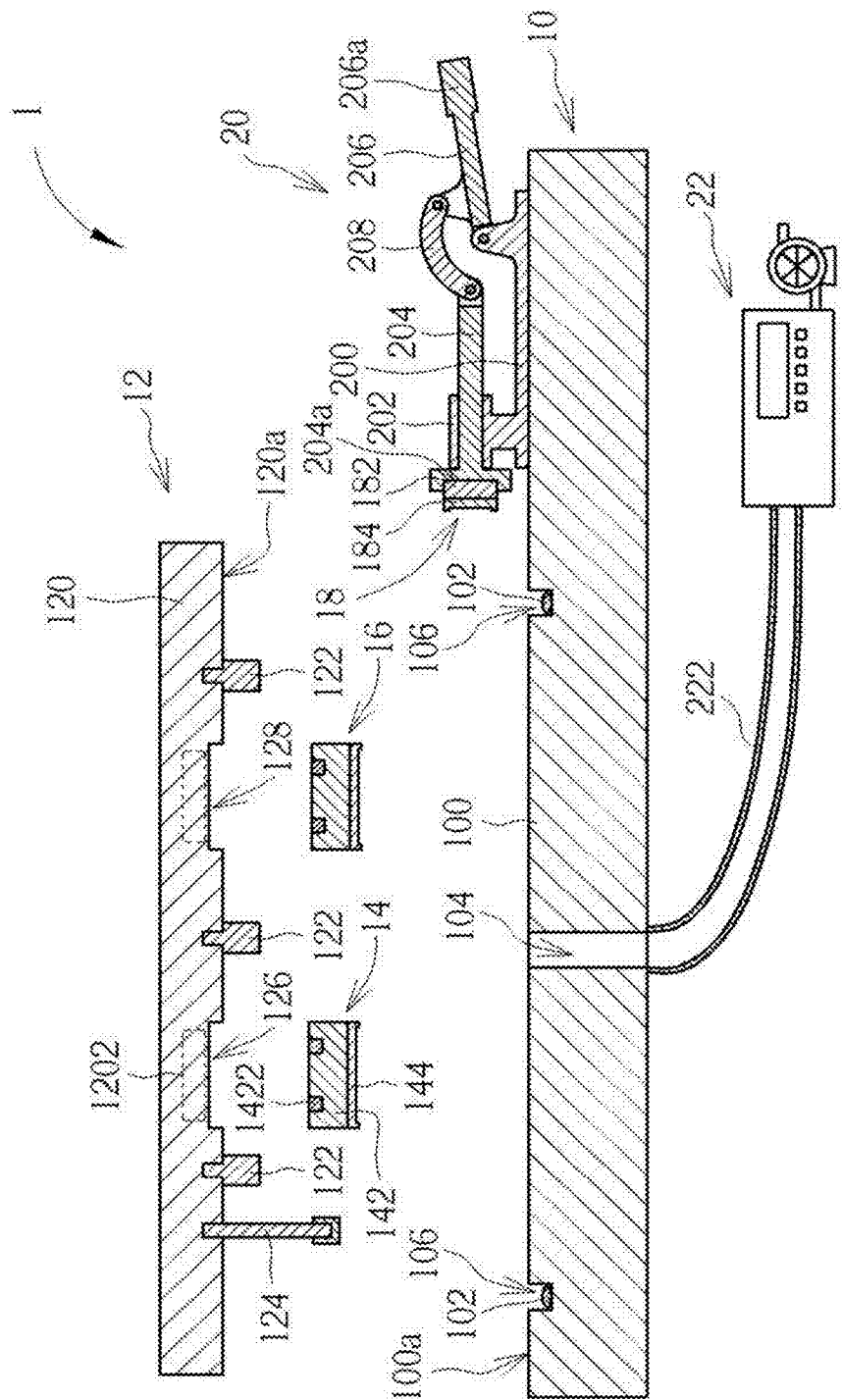
FIG. 1 is a cross-sectional schematic view showing an airtight test apparatus according to a preferred embodiment of the present invention.

Please refer to FIG. 1. FIG. 1 is a cross-sectional schematic view showing an airtight test apparatus 1 according to a preferred embodiment of the present invention. The airtight test apparatus 1 comprises a base 10, a top plate 12, a first sealing member 14, a second sealing member 16, a side sealing member 18, a push mechanism 20 and an air-extracting device 22. The base 10 comprises a body 100 and a sealing ring 102, and the base 10 has an air-extracting hole 103 and a ring-shaped groove 106. The air-extracting hole 104 is formed passing through the body 100, and the ring-shaped groove 106 is formed on a top surface 100a of the body 100 and surrounds the air-extracting hole 104. The sealing ring 102 is disposed in the ring-shaped groove 106.

The top plate 12 is disposed on the base 10 with respect to the top surface 100a and is capable of moving with respect to the base 10. In particular, the abovementioned movement can be carried out by a cylinder. For example, a frame is disposed on the base 10 and the cylinder is disposed on the frame. One end of a piston rod of the cylinder is connected to the top plate 12 to allow the top plate 12 to move by controlling the operation of the cylinder. The top plate 12 comprises a body 120, a plurality of press bars 122 and a sealing bar 124. The top plate 12 has a first receiving groove 126 and a second receiving groove 128 formed on a bottom surface 120a of the body 120, and the bottom surface 120a faces the top surface 100a. In the present embodiment, the press bars 122 and the sealing bar 124 are fixed on the body 120 as additional members. However, the present invention is not limited thereto. The sealing bar 124 has a soft end, such as a sleeved silicon bulb, for sealing.

The first sealing member 14 comprises a fixing member 142 and a sealer 144. The sealer 144 is fixed on the fixing member 142, the fixing member 142 is selectively and detachably disposed in the first receiving groove 126 and it is good for detachably disposing the first sealing member 14 on the top plate 12. However, the present invention is not limited thereto. In general, the first receiving groove 126 matches the structure of the fixing member 142 so that the first receiving groove 126 has positioning function for the first sealing member 14. In addition, in the present embodiment, the fixing member 142 comprises a magnetic attraction portion 1422 (such as a magnet) and the top plate 12 correspondingly comprises a magnetic attraction portion 1202 (the approximately range thereof is shown by a dotted line in FIG. 1) at the bottom of the first receiving 126. Therefore, the fixing member 142 can be detachably disposed in the first receiving groove 126 through a magnetic effect between the magnetic attraction portions 1422, 1202. Therefore, the operator can quickly assemble the first sealing member 14 to the top plate 12 or take the first sealing member 14 away from the top plate 12. In the present embodiment, the body 120 is made of a magnetic material so that the bottom of the first receiving groove 126 can be used as the magnetic attraction portion 1202. However, the present invention is not limited thereto. For example, it also can use a magnet embedded at the bottom of the first receiving groove 126 as the magnetic attraction portion 1202. In particular, the fixing member 142 also can be detachably inserted into the first receiving groove 126 in a tight-fitting or an engagement manner. At that time, the magnetic attraction portions 1422, 1202 can be omitted. In general, the fixing member 142 is made of a hard material (such as engineering plastic) to provide structural support to the first sealing member 14 for the convenience of the assembly and disassembly of the operator and the sealer is made of a soft material for bringing the sealing effect into to full play. However, the present invention is not limited thereto. For example, the first sealing member 14 is integrally made of material having a certain hardness to allow the first sealing member 14 to maintain a certain structural rigidity for the convenience of the assembly and disassembly of the operator, and the first sealing member 14 still has a certain elasticity or flexibility for bringing the sealing effect into to full play. In addition, the airtight test apparatus 1 uses the first sealing member 14 and the second sealing member 16 having the same structures, and the second sealing member 16 also can be selectively and detachably disposed in the second receiving groove 128. Therefore, the description of the second sealing member 16 can be referred to the relative description of the first sealing member 14 as mentioned before and there is no need for further description. However, the present invention is not limited to the second sealing member 16 having the same structure as the first sealing member 14.

The push mechanism 20 is disposed on the body 100 of the base 10, and the side sealing member 18 is connected to the push mechanism 20 so that the push mechanism 20 is selectively allowed to move the side sealing member 18 by operating the push mechanism 20. In the present embodiment, the push mechanism 20 provides the side sealing member 18 with a sliding movement parallel to the top surface 100a. The push mechanism 20 comprises a fixing base 200, a sliding slot 202, a sliding rod 204, a driving rod 206 and a linking bar 208. The fixing base 200 is fixed on the body 100, the sliding slot 202 is fixed on the fixing base 200, the sliding rod 204 is disposed by passing through the sliding slot 202, the driving rod 206 is pivotally connected to the fixing base 200, one end of the linking rod 208 is pivotally connected to one end of the sliding rod 204, the other end of the linking rod 208 is pivotally connected to the driving rod 206, the side sealing member 18 is disposed at the other end of the sliding rod 204, and the driving rod 206 has an operation portion 206a so that the operator can operates the operation portion 206a to drive the push mechanism 20 to push the side sealing member 18. In the present embodiment, the push mechanism 20 can be operated by a linkage mechanism. However, the present invention is not limited thereto; for example, the side sealing member 18 is directly driven to move by the cylinder. The operation details of the linkage mechanism of the push mechanism 20 are well-known and there is no need for further description. In addition, in the present embodiment, the side sealing member 18 can utilize the similar structure of the first sealing member 14. The push mechanism 20 correspondingly has a receiving groove 204a for placing and fixing the side sealing member 18. The side sealing member 18 comprises a fixing member 182 and a sealer 184. The sealer 184 is fixed on the fixing member 182, and the fixing member 182 is detachably disposed in the receiving groove 204a. Therefore, different sealing members 18 can be replaced for the convenience of different additional members 46 of the user. As to the other description of the fixing member 182 and the sealer 184, please refer to the description of the abovementioned first sealing member 14 and there is no need for further description. However, the structure of the side sealing member of the present invention is not limited to the abovementioned embodiment.

The air-extracting device 22 is connected to an opening of the air-extracting hole 104 of the base 10 through an air pipe 222. In particular, the air-extracting device 22 can comprise a vacuum pump for extracting and a barometer. The vacuum pump is provided for extracting and exhausting air to a space, and the barometer is provided for measuring vacuum level of the space. However, the operation concept is well-known and there is no need for further description.

Figure 2:
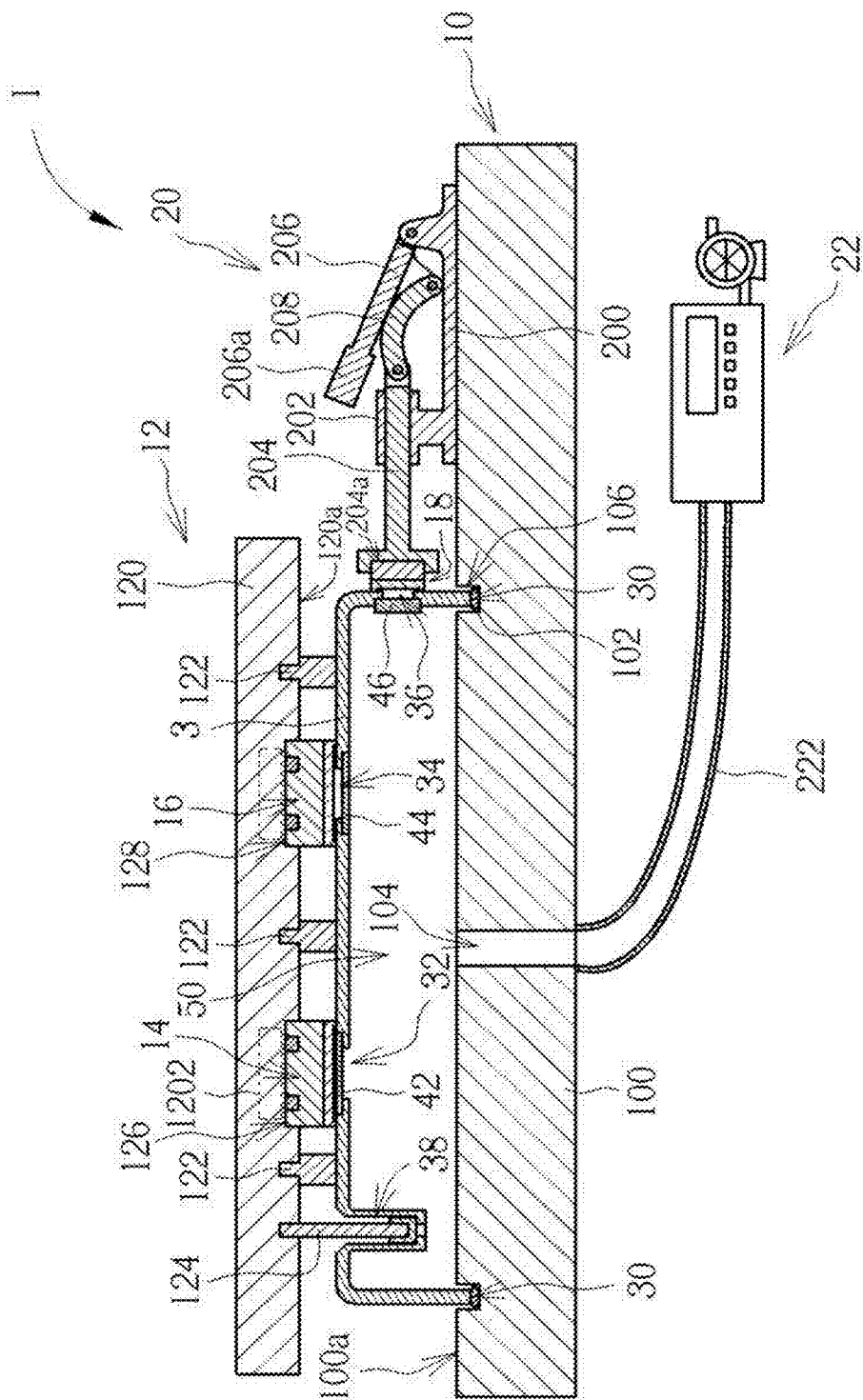
FIG. 2 is a cross-sectional schematic view showing the airtight test apparatus of FIG. 1 has a case to be tested placed thereon.

Please refer to FIG. 2. FIG. 2 is a cross-sectional schematic view showing the airtight test apparatus of FIG. 1 has a case to be tested placed thereon. The airtight test apparatus 1 of the present invention can be used for testing an airtight property of a case 3. The case 3 can be a portion of housing of an electronic device and has a first through hole 32, a second through hole 34 and a side through hole 36. A first additional member 42, a second additional member 44 and a side additional member 46 are connected to the first through hole 32, the second through hole and the side through hole, respectively, to be disposed at the case 3. The first additional member 42, the second additional member 44 and the side additional member 46 can be a speaker, a microphone, a connecting port and a camera lens. The case further comprises a countersink 38, for example, provided for the fixing member (such as a screw) to put inside and pass trough so as to combine with another case. A periphery 30 of the case 3 matches an outline of the ring-shaped groove 106. During test, the case 3 needs to be placed on the base 10. The case 3 is placed on the body 100 at that time to allow the periphery 30 to be placed in the ring-shaped groove 106, and the sealing ring 102 is located between the periphery 30 and the ring-shaped groove 106 to allow the periphery 30 to be tightly connected with the sealing ring 102 so that the case 3 and the body 100 can form a gas chamber 50 connected to the air-extracting hole 104 for exhausting through the air-extracting hole 104. The gas chamber 50 is connected to the air-extracting device 22 through the air-extracting hole 104 to allow the air-extracting device 22 to be capable of extracting air from the gas chamber through the air pipe 222. And then, the top plate 12 can move towards the base 10 to allow the first sealing member 14 and the second sealing member 16 to be against the case 3, respectively, for sealing the first through hole 32 and the second through hole 34, in which the first sealing member 14 is against the case 3 using the sealer 144 thereof for sealing the first through hole 32. The second sealing member 16 is also the same and there is no need for further description. At the same time, the press bar 122 is against the case 3 onto the base 10 and the sealing bar 124 stretches into and uses its soft end to seal the countersink 38. The push mechanism 20 can be operated to push the side sealing member 18 to allow the sealer 184 of the side sealing member 18 to be against the case 3 for sealing the side through hole 36. Therefore, the gas chamber 50 is sealed so that the air-extracting device 22 can extract air from the gas chamber 50 and an air pressure of the gas chamber 50 can be directly or indirectly detected for determining the current airtight property of the case 3.

Figure 3:
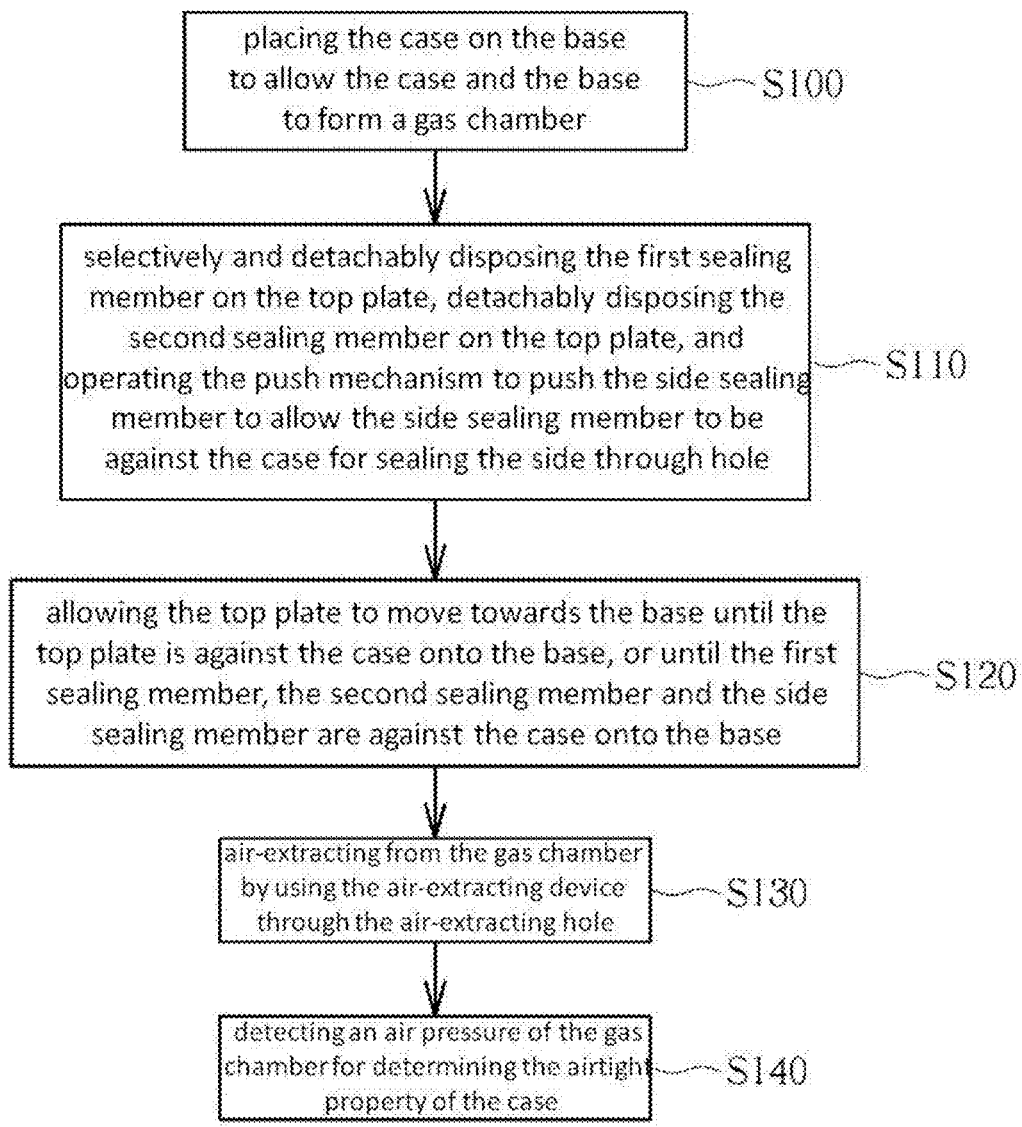
FIG. 3 is a flowchart of an airtight test method according to the present invention.

Please refer to FIG. 1, FIG. 2 and FIG. 3. FIG. 3 is a flowchart of an airtight test method according to the present invention. The airtight test method comprises a step 100 of placing the case 3 on the base 10 at first to allow the case 3 and the base 10 to form the gas chamber 50 connected to the air-extracting hole 104. Because the case 3 has a plurality of through holes 32, 34, 36, where may lose efficacy in sealing, the airtight test method needs to selectively use the first sealing member 14, the second sealing member 16 and the side sealing member 18 for sealing the corresponding through holes 32, 34, 36. Therefore, the airtight test method comprises a step of selectively and detachably disposing the first sealing member 14 on the top plate 12, detachably disposing the second sealing member 16 on the top plate 12 and operating the push mechanism 20 to push the side sealing member 18 to allow the side sealing member 18 to be against the case 3 for sealing the side through hole 36 as shown in step S110. In the step S110, particularly, it may choose one of the first sealing member 14, the second sealing member 16 and the side sealing member 18 for use, or it may not use one of the first sealing member 14, the second sealing member 16 and the side sealing member 18, or all the first sealing member 14, the second sealing member 16 and the side sealing member 18 are not used, or all the first sealing member 14, the second sealing member 16 and the side sealing member 18 are used depending on different determination mechanisms. And then, the airtight test method comprises a step of allowing the top plate 12 to move towards the base 10 until (the press bar 122 of) the top plate 12 is against the case 3 onto the base 10 or until the first sealing member 14, the second sealing member 16 and the side sealing member 18 are against the case 3 onto the base 10 as shown in step S120. The air-extracting device 22 is used for extracting air from the gas chamber 50 through the air-extracting hole 104 as shown in step S130. And then, the air pressure of the gas chamber 50 is detected for determining the airtight property of the case 3 as shown in step S140. In the step S140, if the airtight property of the case 3 is insufficient (for example, the inner air pressure of the gas chamber 50 cannot decrease due to a leak so that the detected air pressure is larger than a predetermined pressure), the airtight test method can further utilize the first sealing member 14, the second sealing member 16 and the side sealing member 18 to confirm where the efficacy of the seal loses. In particular, the airtight test method will adopt different confirmation steps according to different determination mechanisms.

Figure 4A:
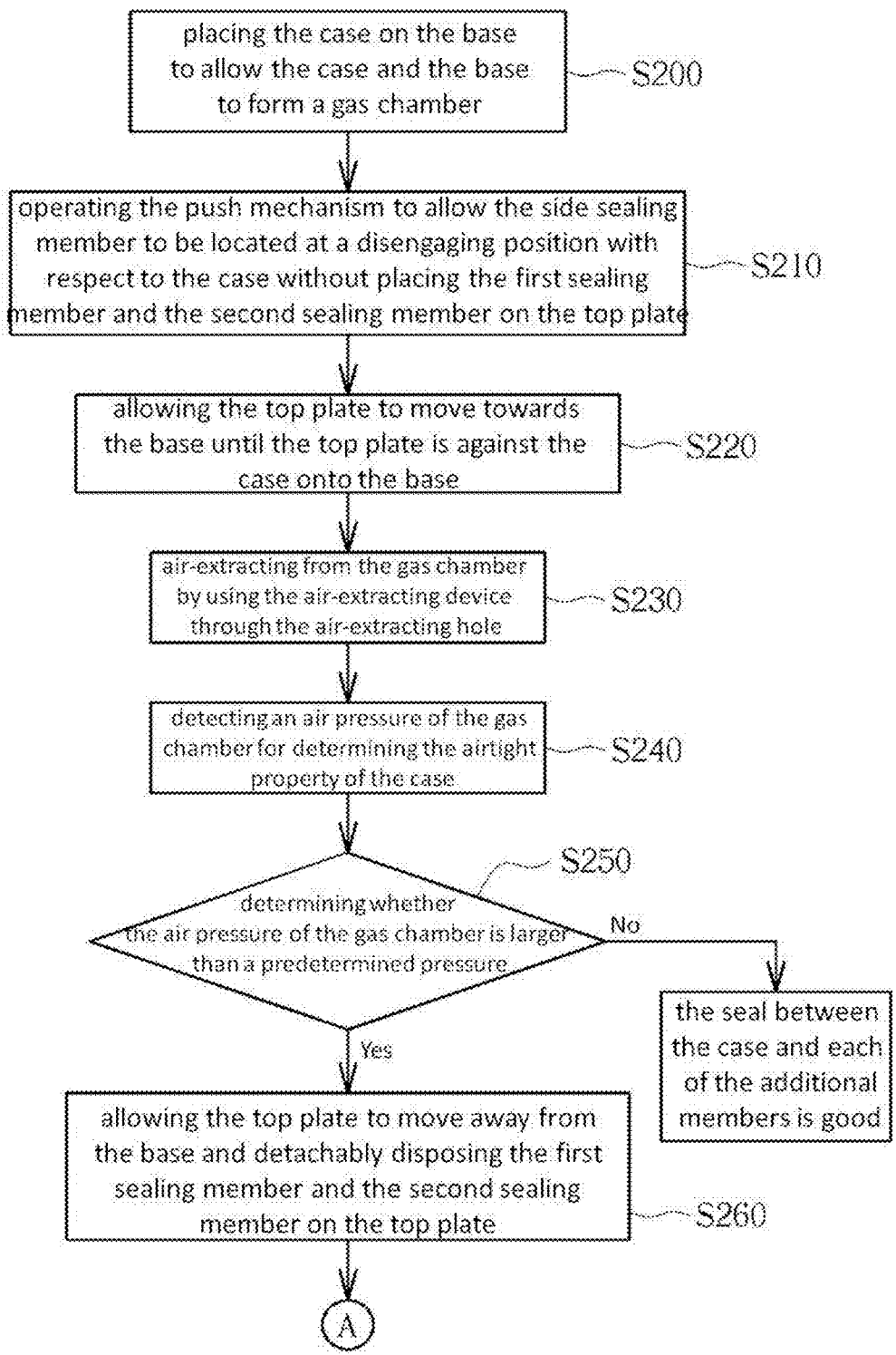
FIGS. 4A to 4C are flowcharts of the airtight test method according to an embodiment of the present invention.
Figure 4B:
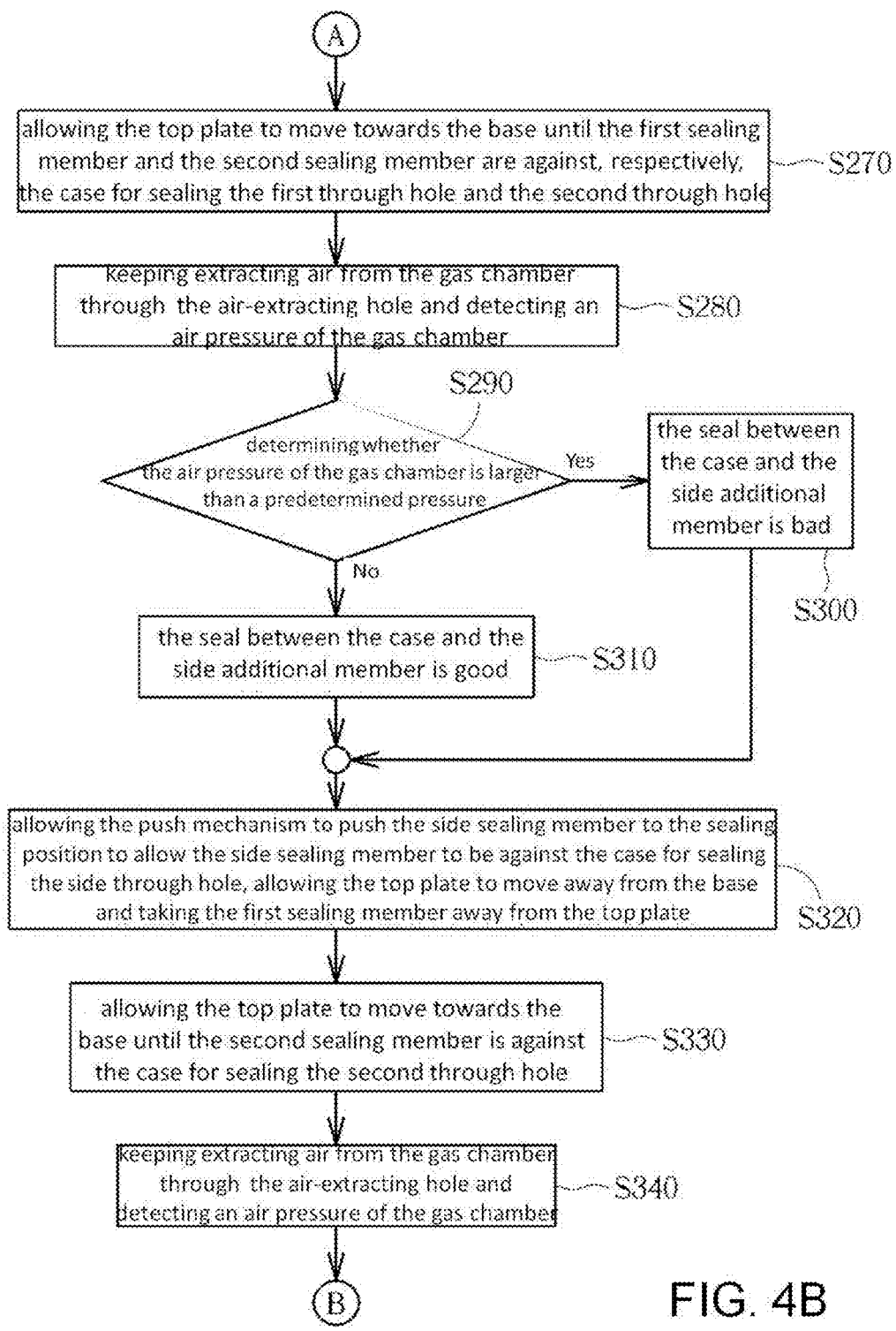
Figure 4C:
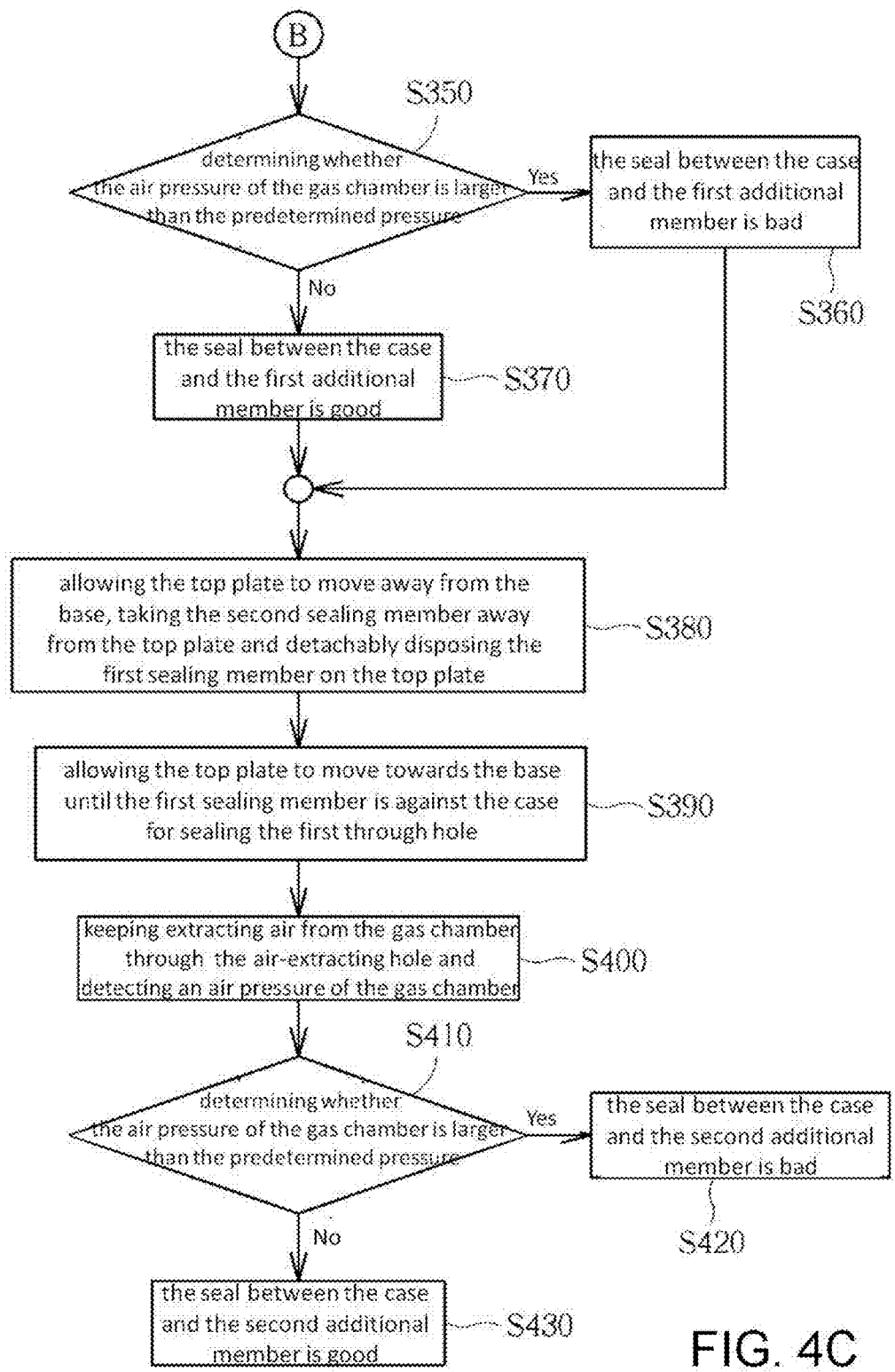
Figure 5:
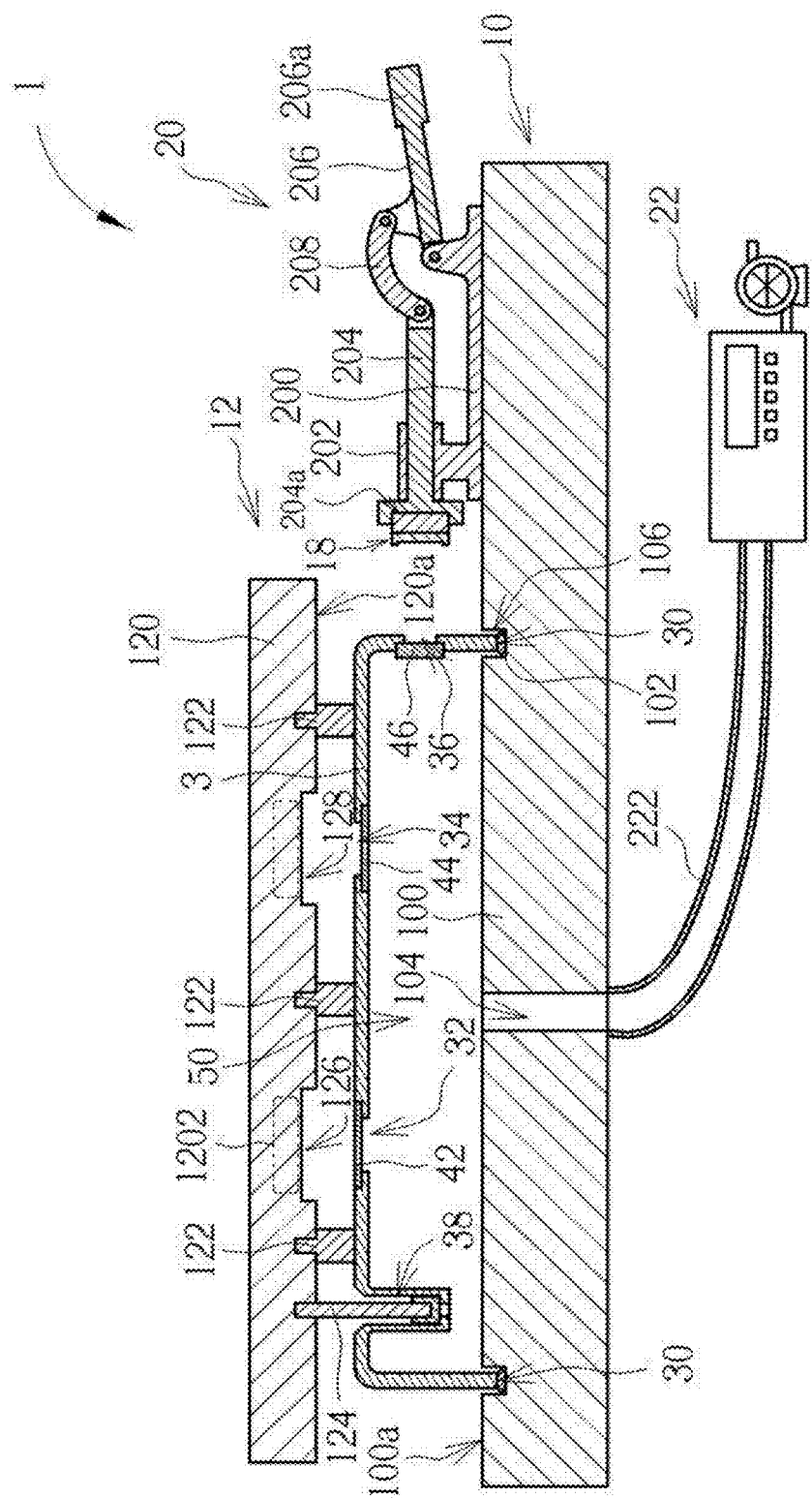
FIGS. 5 to 8 are schematic views showing an airtight test performed by the airtight test apparatus of FIG. 1 according to the flowcharts of FIGS. 4A to 4C.

Please refer to FIGS. 4A to 4C, which are flowcharts of the airtight test method according to an embodiment of the present invention. The airtight test method comprises a step 200 of placing the case 3 on the base 10 at first. The periphery 30 of the case 3 is placed in the ring-shaped groove 106, and the sealing ring 102 is located between the periphery 30 and the ring-shaped groove 106 to allow the periphery 30 to be tightly connected with the sealing ring 102 so that the case 3 and the body 100 can form a gas chamber 50 connected to the air-extracting hole 104. In the present embodiment, the sealing members 14, 16, 18 are not used in the first test so that the airtight test method does not place the first sealing member 14 and the second sealing member 16 on the top plate 12 and the push mechanism 20 is operated to move the side sealing member 18 to a disengaging position with respect to the case 3, that is, the side sealing member 18 does not seal the side through hole 36 as shown in step S210. If the first sealing member 14 and the second sealing member 16 are placed on the top plate 12, the first sealing member 14 and the second sealing member 16 are taken away from the top plate 12. And then, the airtight test method allows the top plate 12 to move towards the base 10 until (the press bar 122 of) the top plate 12 is against the case 3 onto the base 10 as shown in step S220. The air-extracting device 22 is used for extracting air from the gas chamber 50 through the air-extracting hole 104 as shown in step S230. And then, the air pressure of the gas chamber 50 is detected for determining the airtight property of the case 3 as shown in step S240. At that time, a cross-sectional schematic view of the airtight test apparatus 1 and the case 3 is shown as FIG. 5. In practical application, the air pressure of the gas chamber 50 can be maintained under a certain pressure if the case 3 and the additional members 42, 44, 46 have good airtight property. Otherwise, if there are defects occurred on the airtight property between the case 3 and the additional members 42, 44, 46, the air pressure of the gas chamber 50 is difficult to be decreased. In particular, the sealing failure can be determined by comparing the predetermined pressure with the detected pressure P1. The predetermined pressure can be set up according to operation conditions of the vacuum pump of the air-extracting device 22. This is well-known by those of ordinary skill in the art and there is no need for further description. Therefore, in the present embodiment, the airtight test method further determines whether the air pressure of the gas chamber 50 is larger than the predetermined pressure as shown in step S250. If the result of the step S250 is no, it means the airtight property of the case 3 and the additional members 42, 44, 46 is good and the test can be ended.

Figure 6:
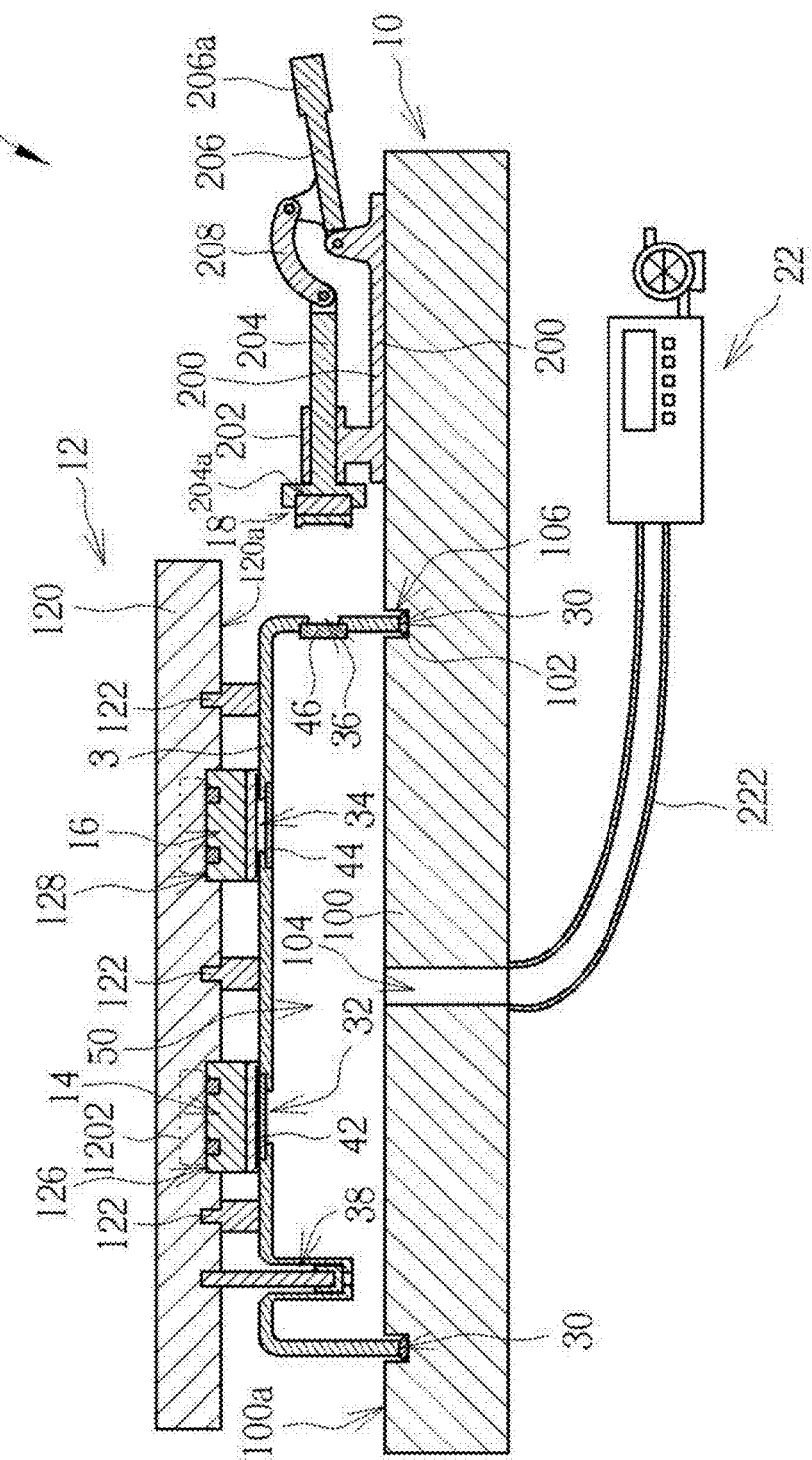

If the result of the step S250 is yes, there is a sealing failure occurred. At that time, the airtight test method further allows the top plate 12 to move away from the base 10 and detachably disposes the first sealing member 14 and the second sealing member 16 on the top plate 12 as shown in step S260. And then, the top plate 12 is allowed to move towards the base 10 until the first sealing member 14 and the second sealing member 16 are against, respectively, the case 3 for sealing the first through hole 32 and the second through hole 34 as shown in step S270. At that time, a cross-sectional view of the airtight test apparatus 1 and the case 3 is shown as FIG. 6. The airtight test method then comprises a step of extracting air from the gas chamber 50 through the air-extracting hole 104 and detecting the air pressure of the gas chamber 50 as shown in step S280. And then, it determines whether the air pressure of the gas chamber 50 (the air pressure detected in the step S280) is larger than the predetermined pressure as shown in step S290. If the result of the step S290 is yes, there is a sealing failure occurred. In principle, if the sealing failure may be only occurred between the case 3 and the additional members 42, 44, 46, it means the sealing failure between the case and the side additional member 46 as shown in step S300. At that time, in particular, the air-extracting device 22 can be further operated without moving the top plate 12 to move the side sealing member 18 to a sealing position (please refer to FIG. 2) to allow the side sealing member 18 to be against the case 3 for sealing the side through hole 36. Because the air-extracting device 22 still extracts air from the gas chamber 50 through the air-extracting hole 104, the air pressure of the gas chamber 50 can be detected for determining the airtight property of the case 3. That is, there is a sealing failure occurred at other places of the case 3 if the air pressure is still larger than the predetermined pressure. If the air pressure is smaller than the predetermined pressure, the abovementioned sealing failure means the sealing failure between the case and the side additional member 46. The seal of the case 3 and the additional members 42, 44, 46 is good if the result of the step S280 is no, but there is still a sealing failure occurred between the case 3 and the additional members 42, 44 as shown in step S310. So far the seal between the case 3 and the side additional member 46 has been confirmed.

Figure 7:
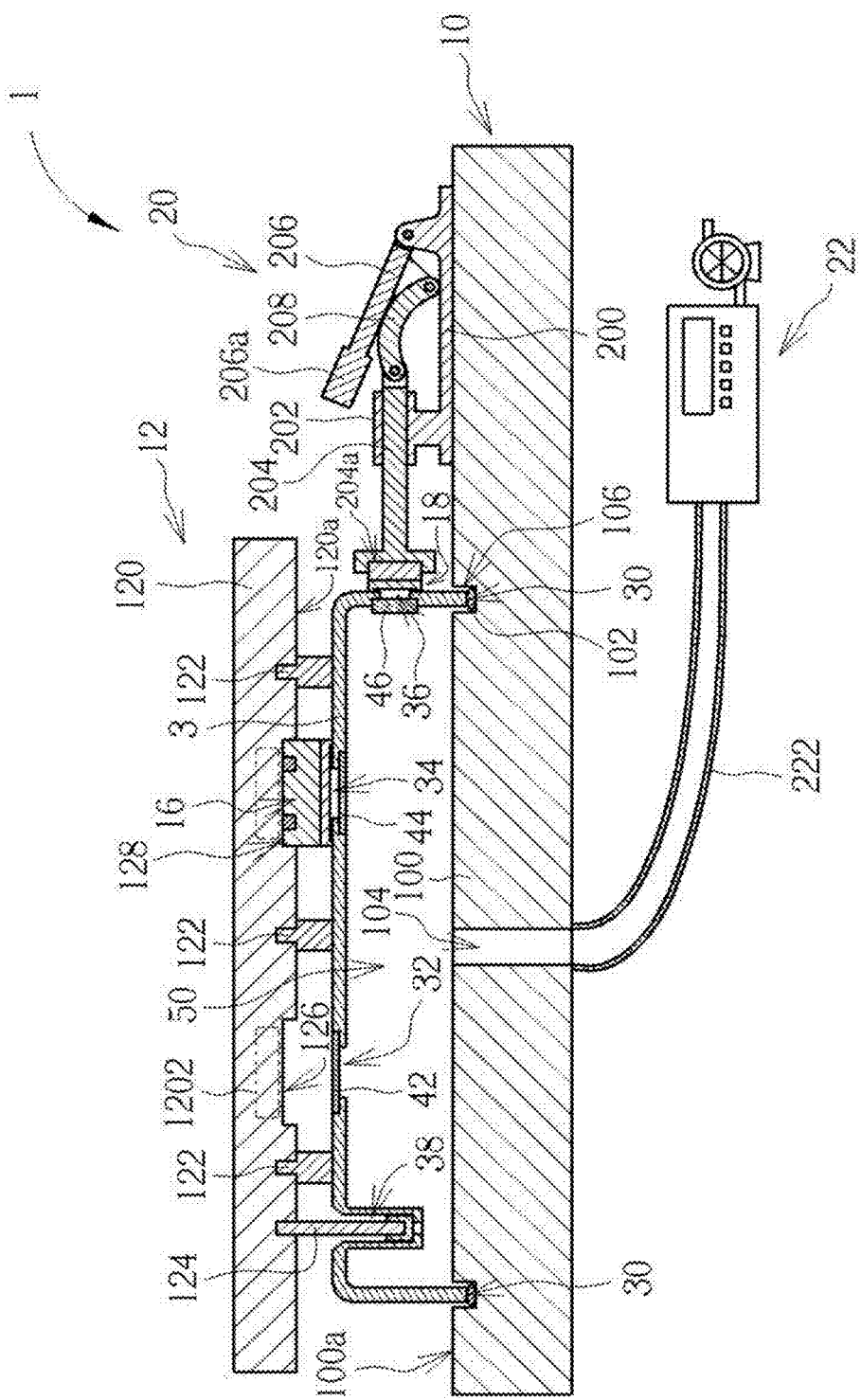

No matter what the abovementioned result is, the airtight test method further allows the push mechanism 20 to push the side sealing member 18 to a sealing position to allow the side sealing member 18 to be against the case 3 for sealing the side through hole 36 and to allow the top plate 12 to move away from the base 10 and then the first sealing member 14 is taken away from the top plate 12 as shown in step S320. And then, the top plate 12 is allowed to move towards the base 10 until the second sealing member 16 is against the case 3 for sealing the second through hole 34 as shown in step S330. At that time, a cross-sectional view of the airtight test apparatus 1 and the case 3 is shown as FIG. 7. There is a supplementary description that, in particular, the operation of sealing the side through hole 36 by the side sealing member 18 can be omitted in step S320 if the seal between the case 3 and the side additional member 46 has been confirmed to be good (as shown in step S310). The airtight test method then comprises a step of extracting air from the gas chamber 50 through the air-extracting hole 104 and detecting the air pressure of the gas chamber 50 as shown in step S340. And then, it determines whether the air pressure of the gas chamber 50 (the air pressure detected in the step S340) is larger than the predetermined pressure as shown in step S350. If the result of the step S350 is yes, it means the seal of the case 3 and the first additional member 42 is bad as shown in step S360. If the result of the step S350 is no, it means the seal of the case 3 and the first additional member 42 is good as shown in step S370. So far the seal between the case 3 and the first additional member 42 has been confirmed.

Figure 8:
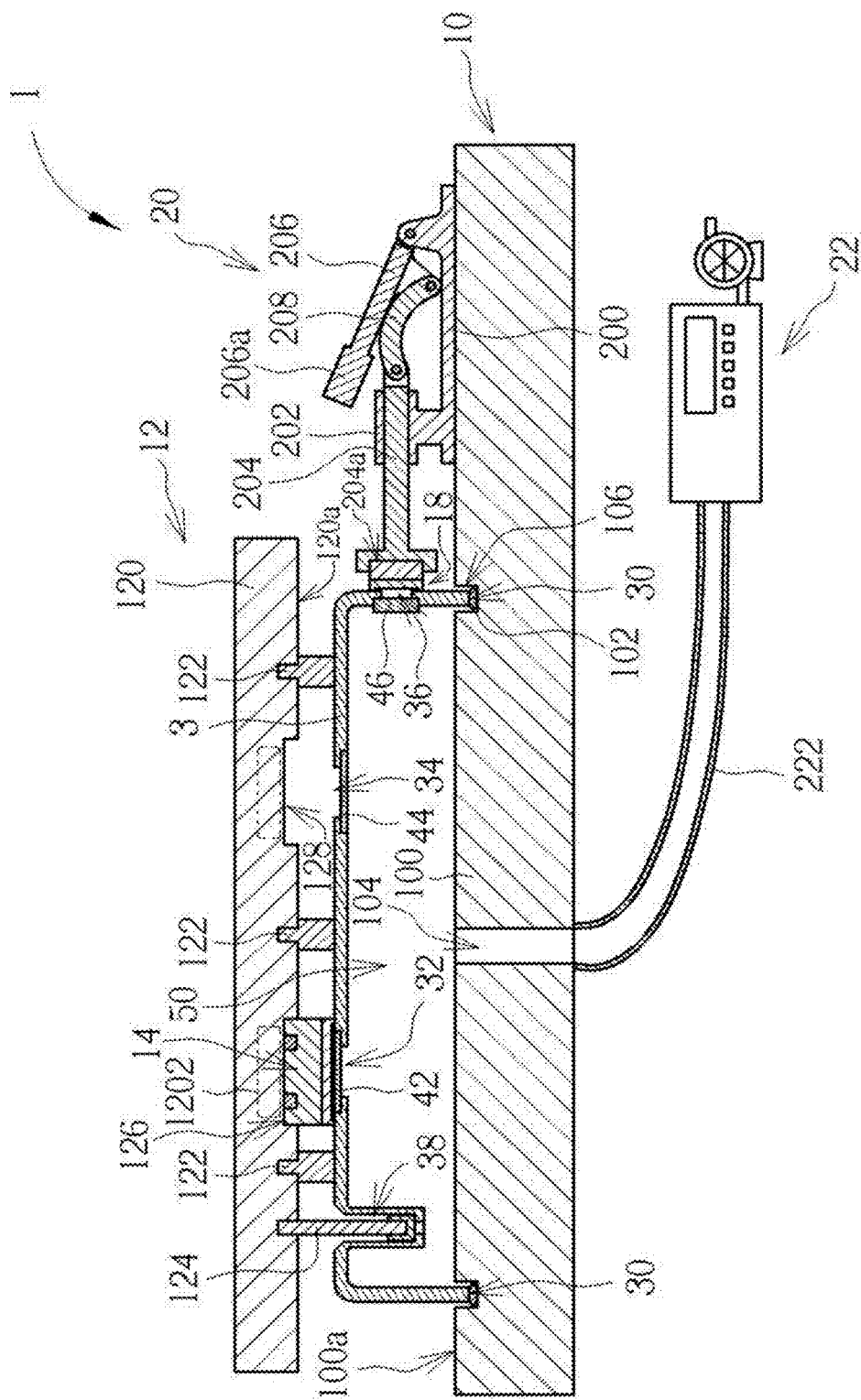

Similarly, no matter what the abovementioned result is, the airtight test method further allows the top plate 12 to move away from the base 10, takes the second sealing member 16 away from the top plate 12 and detachably disposes the first sealing member 14 on the top plate 12 as shown in step S380. And then, the top plate 12 is allowed to move towards the base 10 until the first sealing member 14 is against the case 3 for sealing the first through hole 32 as shown in step S390. At that time, a cross-sectional view of the airtight test apparatus 1 and the case 3 is shown as FIG. 8. There is a supplementary description that, in particular, the operation of detachably disposing the first sealing member 14 on the top plate 12 can be omitted in step S380 if the seal between the case 3 and the first additional member 42 has been confirmed to be good (as shown in step S370). The airtight test method then comprises a step of extracting air from the gas chamber 50 through the air-extracting hole 104 and detecting the air pressure of the gas chamber 50 as shown in step S400. And then, it determines whether the air pressure of the gas chamber 50 (the air pressure detected in the step S400) is larger than the predetermined pressure as shown in step S410. If the result of the step S410 is yes, it means the seal of the case 3 and the second additional member 44 is bad as shown in step S420. If the result of the step S410 is no, it means the seal of the case 3 and the second additional member 44 is good as shown in step S430. So far the seal between the case 3 and the second additional member 44 has been confirmed. That is to say, the seal between the case 3 and the additional members 42, 44, 46 has been confirmed. The test is finished and the rework is performed according to the abovementioned result. There is a supplementary description that, in the abovementioned processes, the present invention does not need to keep extracting air from the gas chamber 50 by the air-extracting device 22. In particular, the air-extracting operation can be restored a small period before detecting the air pressure so that the energy consumption of the air-extracting device 22 can be reduced.

Figure 9A:
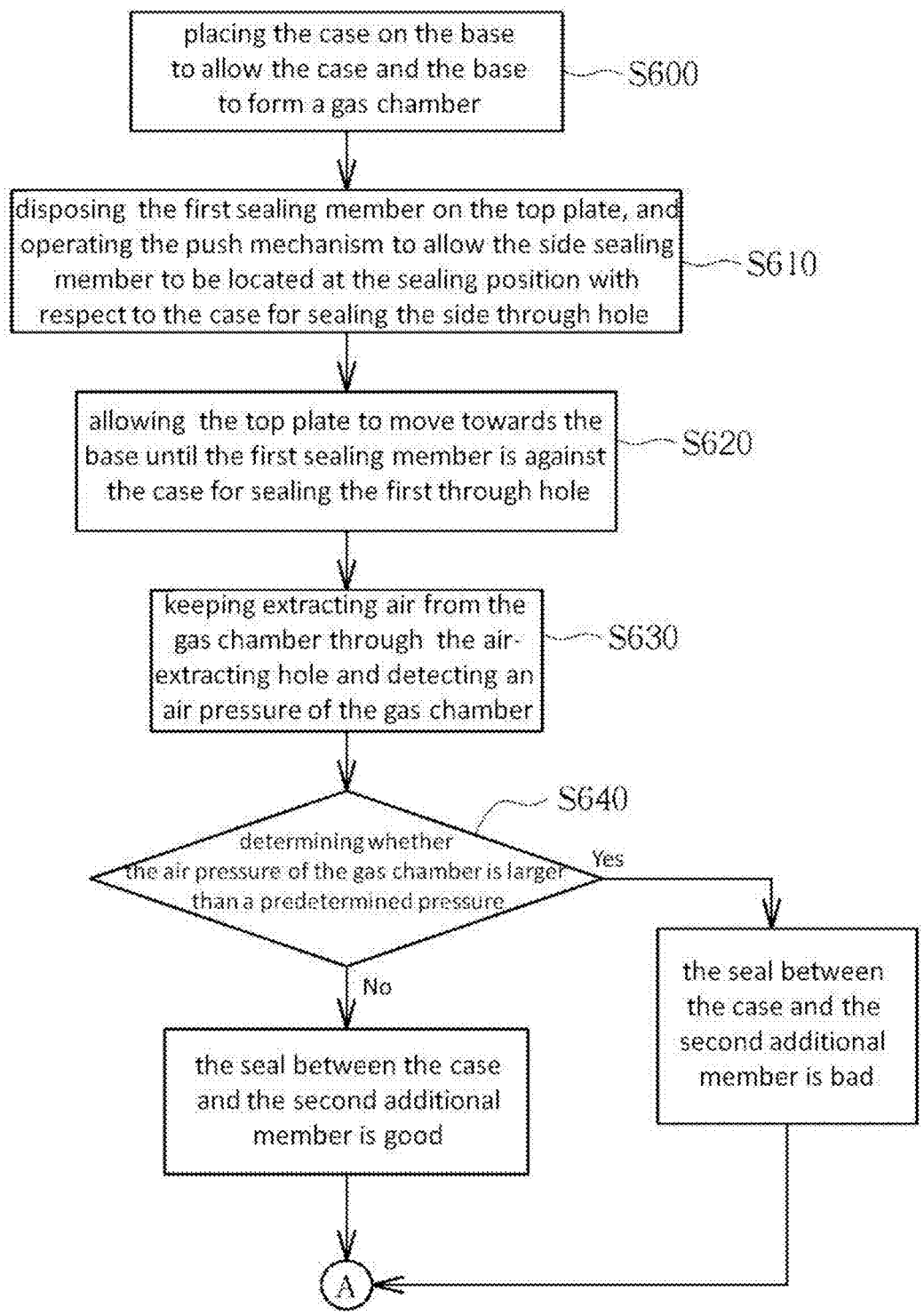
FIGS. 9A to 9C are flowcharts of the airtight test method according to another embodiment of the present invention.
Figure 9B:
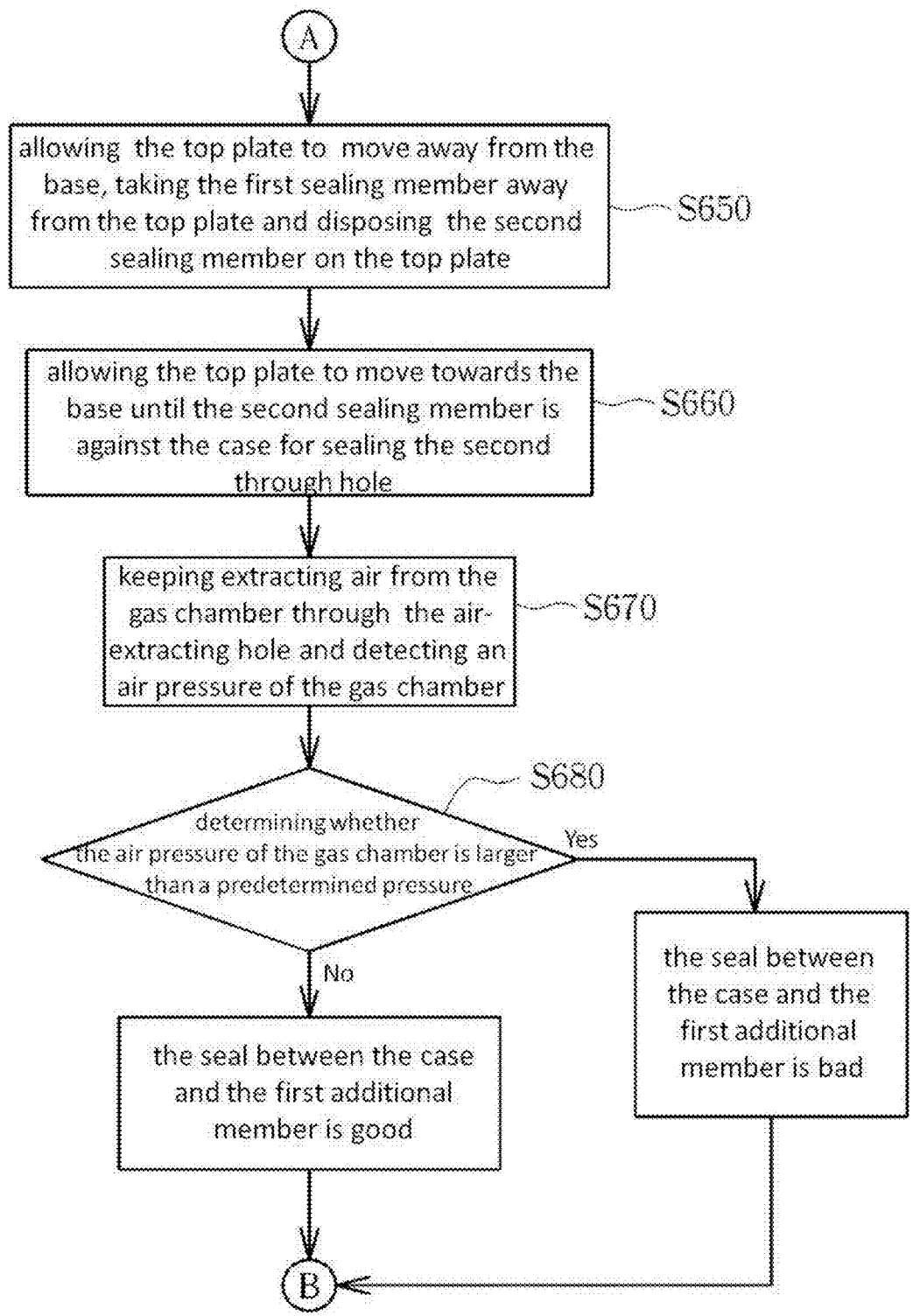
Figure 9C:
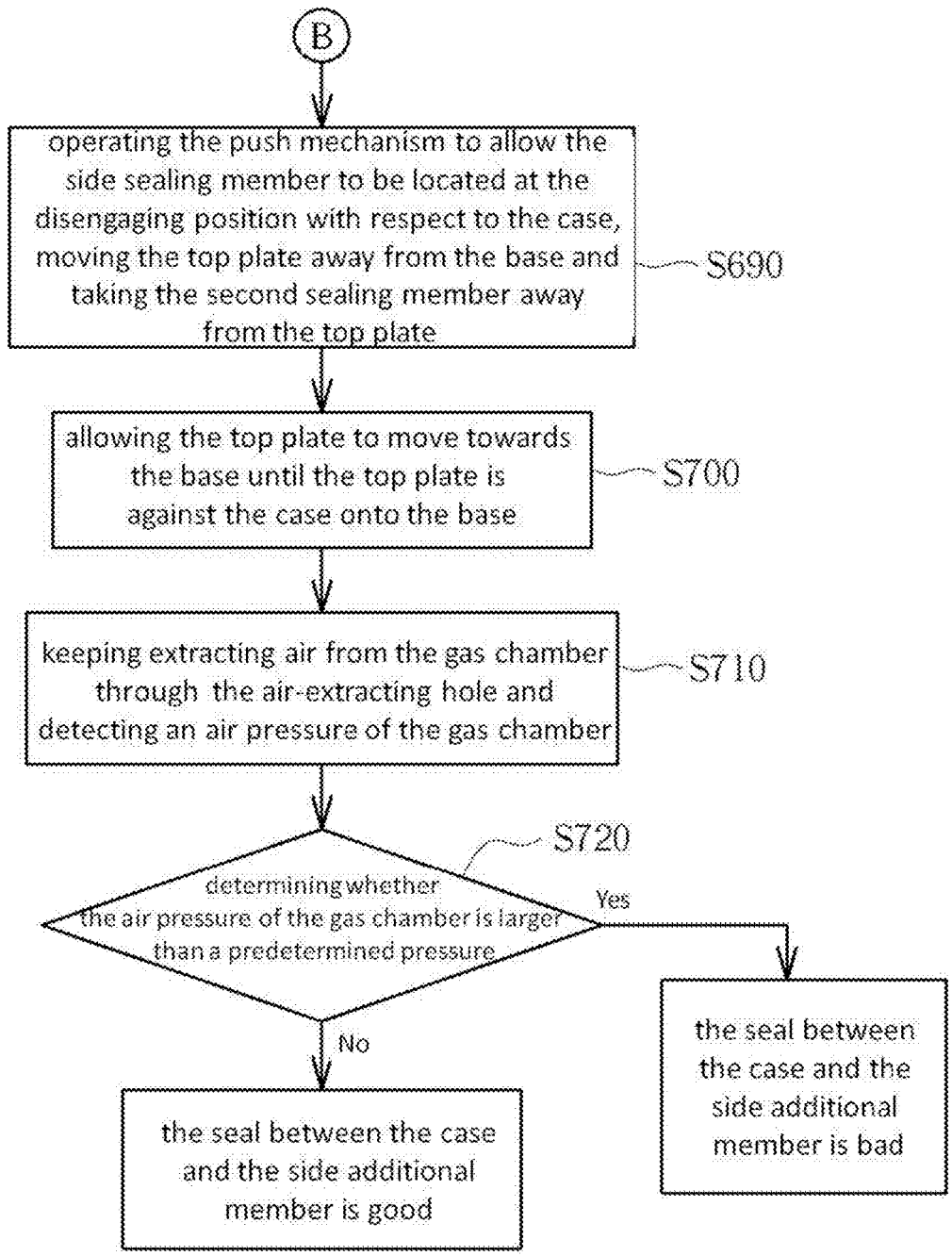

In addition, particularly, the present invention can perform different designs of the test process to cooperate with the manufacturing variability of the practical products. Please refer to FIGS. 9A to 9C, which are flowcharts of the airtight test method according to another embodiment of the present invention. In the present embodiment, for simplifying the description, the present embodiment is only applied to the sealing failure probably occurred between the case 3 and the additional members 42, 44, and 46. After placing the case 3 on the base 10 to form the gas chamber 50 as shown in step S600, the airtight test method places the first sealing member 14 on the top plate 12 first and operates the push mechanism 20 to allow the side sealing member 18 to be located at the sealing position with respect to the case 3 as shown in step S610. And then, the airtight test method allows the top plate 12 to move towards the base 10 until the first sealing member 14 is against the case 3 for sealing the first through hole 32 as shown in step S620. At that time, a cross-sectional view of the airtight test apparatus 1 and the case 3 is shown as FIG. 8. The airtight test method then comprises a step of extracting air from the gas chamber 50 through the air-extracting hole 104 and detecting the air pressure of the gas chamber 50 as shown in step S630. And then, it determines whether the air pressure of the gas chamber 50 (the air pressure detected in the step S630) is larger than the predetermined pressure as shown in step S640. If the result of the step S640 is yes, it means the seal of the case 3 and the second additional member 44 is bad. If the result of the step S640 is no, it means the seal of the case 3 and the second additional member 44 is good.

And then, the airtight test method further allows the top plate 12 to move away from the base 10, takes the first sealing member 14 away from the top plate 12 and detachably disposes the second sealing member 16 on the top plate 12 as shown in step S650. And then, the airtight test method allows the top plate 12 to move towards the base 10 until the second sealing member 16 is against the case 3 for sealing the second through hole 34 as shown in step S660. At that time, a cross-sectional view of the airtight test apparatus 1 and the case 3 is shown as FIG. 7. The airtight test method then comprises a step of extracting air from the gas chamber 50 through the air-extracting hole 104 and detecting the air pressure of the gas chamber 50 as shown in step S670. And then, it determines whether the air pressure of the gas chamber 50 is larger than the predetermined pressure as shown in step S680. If the result of the step S680 is yes, it means the seal of the case 3 and the first additional member 42 is bad. If the result of the step S680 is no, it means the seal of the case 3 and the first additional member 44 is good.

The airtight test method then allows the push mechanism 20 to push the side sealing member 18 to the disengaging position, allows the top plate 12 to move away from the base 10 and takes the second sealing member 16 away from the top plate 12 as shown in step S690. And then, the airtight test method allows the top plate 12 to move towards the base 10 until (the press bar 122 of) the top plate 12 is against the case 3 onto the base 10 as shown in step S700. At that time, a cross-sectional view of the airtight test apparatus 1 and the case 3 is shown as FIG. 5. The airtight test method then comprises a step of extracting air from the gas chamber 50 through the air-extracting hole 104 and detecting the air pressure of the gas chamber 50 as shown in step S710. And then, it determines whether the air pressure of the gas chamber 50 is larger than the predetermined pressure as shown in step S720. If the result of the step S720 is no, it means the seal of the case 3 and the side additional member 46 is good. If the result of the step S720 is yes, it means the seal of the case 3 and the side additional member 46 is bad.

In each abovementioned embodiment, the airtight test method confirms such as the sealing situations between the case 3 and the additional members 46, 44 and 42 one by one when there are sealing failures occurred between the case e and the additional members 46, 44 and 42. However, the present invention is not limited thereto. For example, they can be confirmed by a different order or by a more complicate determining method (such as a logic operation). In addition, the present embodiment has described the confirmation method of the sealing situation for three additional members. Therefore, those of ordinary skill in the art can deal with two or more additional members according to the abovementioned description and there is no need for further description.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An airtight test method using an airtight test apparatus for testing an airtight property of a case assembled with a first additional member and a second additional member thereon, wherein the case has a first through hole connected to the first additional member and a second through hole connected to the second additional member, wherein the airtight test apparatus comprises a base having an air-extracting hole, a top plate disposed on the base and capable of moving with respect to the base and a first sealing member and a second sealing member selectively and detachably disposed on the top plate, comprising the following steps:

(a) placing the case on the base to allow the case and the base to form a gas chamber connected to the air-extracting hole;

(b) detachably disposing the second sealing member on the top plate;

(c) allowing the top plate to move towards the base until the second sealing member already disposed on the top plate is against the case onto the base for sealing the second through hole;

(d) extracting air from the gas chamber through the air-extracting hole; and (e) detecting an air pressure of the gas chamber for determining the airtight property of the case, the step (e) further comprising:

(e11) allowing the top plate to move away from the base, taking the second sealing member away from the top plate and detachably disposing the first sealing member on the top plate;

(e12) allowing the top plate to move towards the base until the first sealing member is against the case onto the base for sealing the first through hole;

(e13) extracting air from the gas chamber through the air-extracting hole; and (e14) detecting the air pressure of the gas chamber for determining the airtight property of the case.

2. The airtight test method according to claim 1, wherein the step (e) further comprises the following steps:

(e21) allowing the top plate to move away from the base and taking the first sealing member or the second sealing member already disposed on the top plate away from the top plate;

(e22) allowing the top plate to move towards the base until the top plate is against the case onto the base;

(e23) extracting air from the gas chamber through the air-extracting hole; and (e24) detecting the air pressure of the gas chamber for determining the airtight property of the case.

3. The airtight test method according to claim 1, wherein the case has a side through hole, a side additional member connected to the side through hole and the airtight test apparatus further comprises a side sealing member and a push mechanism disposed on the base in which the side sealing member is connected to the push mechanism and the step (c) further comprises a step of selectively allowing the push mechanism to push the side sealing member to be against the case for sealing the side through hole.

4. The airtight test method according to claim 3, wherein the first sealing member and the second sealing member are both disposed on the top plate in the step (b), the top plate moves towards the base until the first sealing member and the second sealing member already disposed on the top plate are against the case onto the base for sealing the first through hole and the second through hole, and the side sealing member is not against the case for sealing the side through hole in the step (c) and the step (e) further comprises the following steps:

(e31) allowing the push mechanism to move the side sealing member to a sealing position as the air pressure is higher than a predetermined pressure to allow the side sealing member to be against the case for sealing the side through hole;

(e32) extracting air from the gas chamber through the air-extracting hole; and (e33) detecting the air pressure of the gas chamber for determining the airtight property of the case.

5. The airtight test method according to claim 3, wherein the side sealing member is against the case for sealing the side through hole in the step (c) and the step (e) further comprises the following steps:

(e41) allowing the push mechanism to move the side sealing member to a disengaging position to allow the side sealing member not to contact the case;

(e42) allowing the top plate to move away from the base and taking the first sealing member or the second sealing member already disposed on the top plate away from the top plate (e43) allowing the top plate to move towards the base until the top plate is against the case onto the base;

(e44) extracting air from the gas chamber through the air-extracting hole; and (e45) detecting the air pressure of the gas chamber for determining the airtight property of the case.

6. The airtight test method according to claim 3, wherein the second sealing member seals the second through hole and the side sealing member is against the case for sealing side through hole in the step (c) and the step (e) further comprises the following steps:

(e51) allowing the top plate to move away from the base, taking the second sealing member away from the top plate and detachably disposing the first sealing member on the top plate;

(e52) allowing the top plate to move towards the base until the first sealing member is against the case onto the base for sealing the first through hole;

(e53) extracting air from the gas chamber through the air-extracting hole; and (e54) detecting the air pressure of the gas chamber for determining the airtight property of the case.

7. An airtight test apparatus for testing an airtight property of a case assembled with a first additional member and a second additional member thereon, wherein the case has a first through hole connected to the first additional member and a second through hole connected to the second additional member, comprising:

a base provided for carrying the case and having an air-extracting hole, wherein the case and the base form a gas chamber connected to the air-extracting hole as the case is placed on the base and the gas chamber is capable of exhausting through the air-extracting hole;

a top plate disposed on the base and capable of moving with respect to the base;

a first sealing member selectively and detachably disposed on the top plate, wherein the first sealing member comprises a fixing member detachably disposed on the top plate and a sealer fixed on the fixing member, the top plate is capable of moving towards the base as the case is placed on the base and the fixing member is disposed on the top plate to allow the sealer to be against the case for sealing the first through hole; and a second sealing member selectively and detachably disposed on the top plate, wherein the top plate is capable of moving towards the base as the case is placed on the base to allow the second sealing member to be against the case for sealing the second through hole.

8. The airtight test apparatus according to claim 7, wherein the base has a ring-shaped groove and a sealing ring in which the ring-shaped groove matches a periphery of the case, the sealing ring is disposed in the ring-shaped groove and the case and the base form the gas chamber when the case is placed on the base to allow the periphery of the case to be placed inside the ring-shaped groove and tightly combined with the sealing ring.

9. The airtight test apparatus according to claim 7, wherein the fixing member comprises a first magnetic attraction portion, the top plate comprises a second magnetic attraction portion and the fixing member is detachably disposed on the top plate by a magnetic effect between the first magnetic attraction portion and the second magnetic attraction portion.

10. The airtight test apparatus according to claim 7, wherein the top plate comprises a first receiving groove and a second receiving groove in which the first sealing member is detachably disposed in the first receiving groove therein and the second sealing member is detachably disposed in the second receiving groove.

11. The airtight test apparatus according to claim 7, wherein the case has a side through hole, a side additional member connected to the side through hole and the airtight test apparatus further comprises a side sealing member and a push mechanism disposed on the base in which the side sealing member is connected to the push mechanism to selectively allow the push mechanism to push the side sealing member to be against the case for sealing the side through hole.

12. The airtight test apparatus according to claim 7, wherein the top plate has a plurality of press bars used to be against the case onto the base.

13. The airtight test apparatus according to claim 12, wherein the case has a countersink, the top plate comprises a sealing bar and the top plate is capable of moving towards the base to allow the sealing bar to stretch into and seal the countersink when the case is placed on the base.

14. The airtight test apparatus according to claim 7, further comprising an air-extracting device connected to the base for extracting air from the gas chamber through the air-extracting hole and detecting an air pressure of the gas chamber through the air-extracting hole.

* * * * *